INVENTOR.
JOHN L. EVANS
BY
Constantine A. Michalos
ATTORNEY

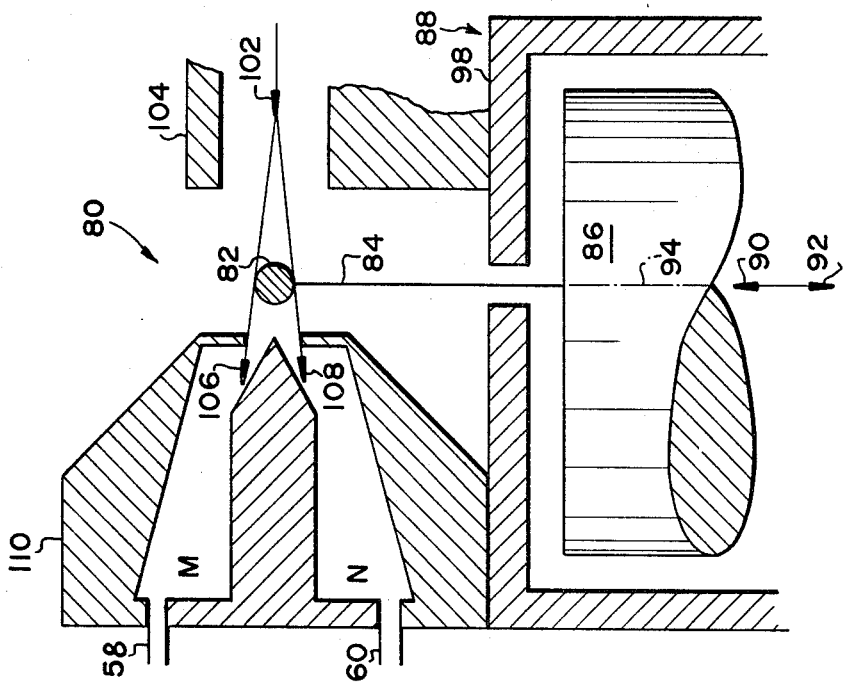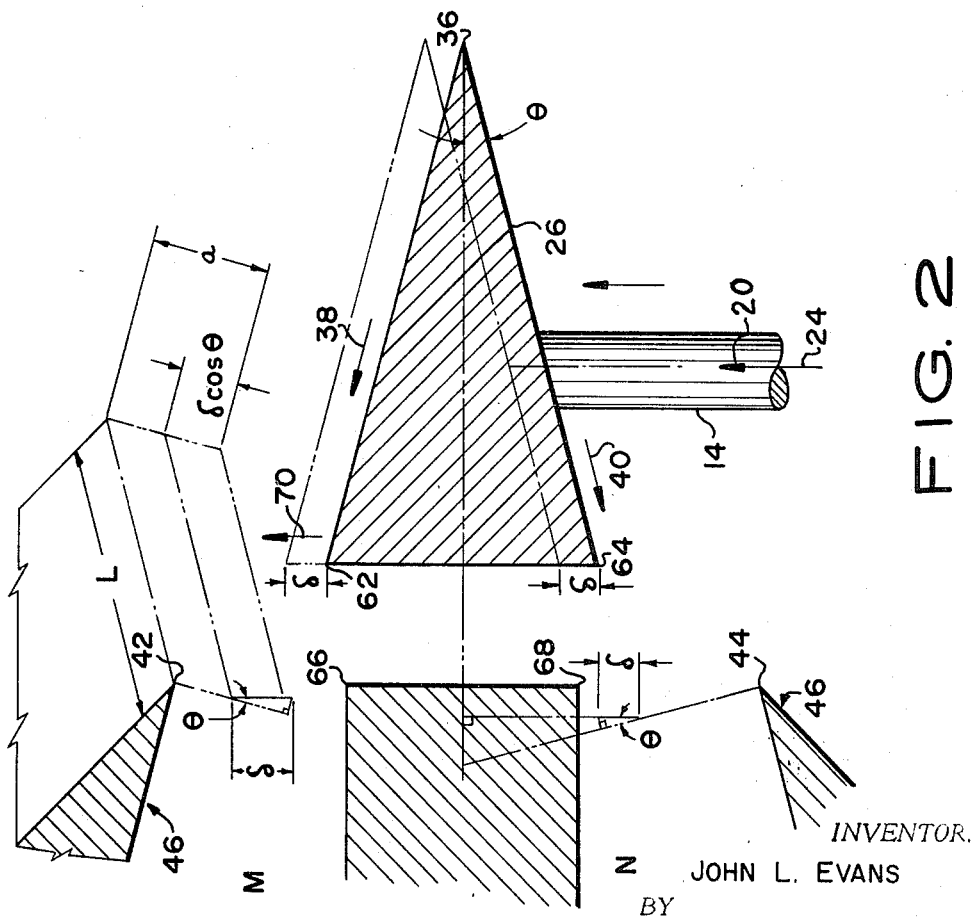

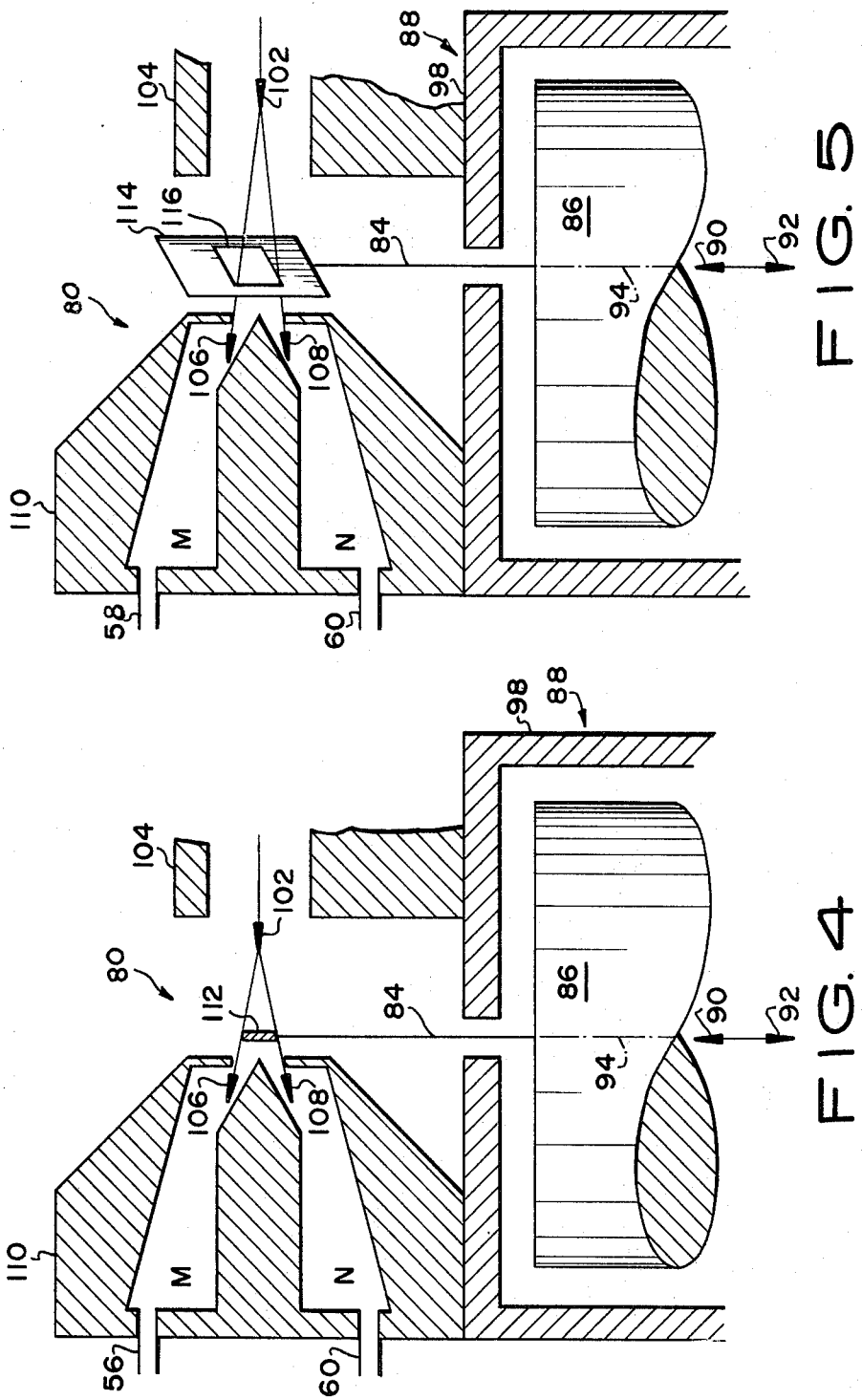

United States Patent Office 3,509,775
Patented May 5, 1970

3,509,775
PNEUMATIC LINEAR DISPLACEMENT PICKOFF
John L. Evans, Oakland, N.J., assignor to Singer-General Precision, Inc., a corporation of Delaware
Filed June 1, 1967, Ser. No. 642,742
Int. Cl. F15c *3/00, 4/00*
U.S. Cl. 73—515                                    6 Claims

ABSTRACT OF THE DISCLOSURE

A pneumatic linear displacement pickoff apparatus having an obstructing movably controlled element connected to the moving body of an instrument whose position is to be sensed such as the proof mass of an accelerometer. The obstructing movably controlled element interposed between a gas jet stream and a receiver which is connected to a pressure sensor or control system.

The obstructing movably controlled element having a cross-sectional configuration such as of a wedge-shaped knife edge or of a circular shape or of a rectangular shape. All cross-sectional configurations having a transverse length extending substantially perpendicularly to the path of the gas jet stream. The obstruction may also be in the form of a plate having an orifice. The plane of the plate being also extending perpendicular to the path of the gas jet stream and connected to the moving element of an instrument to be sensed.

In addition, the gas jet stream being directed transversely to the sensitive axis of the proof mass so as not to interfere with the forces, such as the acceleration forces, being sensed. The pressure sensor operably detecting a differential pressure output which is proportional to the linear displacement of the obstructing controlled movable element which is dependent to the linear displacement of the proof mass of the accelerometer.

BACKGROUND OF THE INVENTION

Field of the invention

This invention relates generally to a pickoff system and more particularly to a pneumatic linear displacement pickoff apparatus utilizing an obstructing movably controlled element interposed between a gas jet stream and a pressure sensor or control system.

Description of the prior art

Heretofore, the pickoff system utilized somehow required the connection of a pneumatic line to the moving element of the instrument causing undesired restraints on that element. The problems that were involved in this type of pickoff were that the pickoff was connected to the sensing element and thus would interfere with the actual operation of the system. Also since the direction of the gas flow striking the pickoff was in the direction of the sensitive axis of the moving element, large interaction between the gas flow in the pickoff and the sensing element occurred.

SUMMARY OF THE INVENTION

In the pneumatic linear displacement pickoff apparatus, to which this invention is directed, the obstructing movably controlled element of the pickoff does not interfere with the actual operation of the sensing element of the instrument since the direction of the gas flow striking the obstructing element is perpendicular to the motion of the sensing element such as the proof mass of the accelerometer. That is, the obstructing movably controlled element of the pickoff is receiving the gas flow perpendicular to the motion of the moving part of the pickoff and the motion of the sensing element and therefore low interaction between the jet and the pickoff and sensing element occurs.

Therefore, an object of this invention is to provide a pneumatic linear displacement pickoff wherein the direction of the gas flow striking the obstructing movably controlled element of the pickoff is perpendicular to the sensitive direction of the pickoff and therefore low interaction between the jet and the pickoff occurs.

Another object of this invention is to provide a pneumatic linear displacement pickoff having an obstructing movably controlled element connected to the movable body whose position is to be sensed and interposed between gas jet stream and a pressure sensor wherein the direction of the jet stream is perpendicular to the sensitive axis of the instrument's moving body and therefore low interaction between the jet stream and the movable body occurs.

Another object of this invention is to provide a pneumatic linear displacement pickoff having no pneumatics attached to its moving element.

Another object of this invention is to provide a pneumatic linear displacement pickoff where no active fluid components are required on the moving element of the pickoff.

Still another object of this invention is to provide a pneumatic linear displacement pickoff in which there is no obstruction, other than the obstructing movably controlled element of the pickoff, to produce thereby a higher reaction force on the moving element whose position is to be sensed.

Other objects and many additional advantages will be more readily understood by those skilled in the art after a detailed consideration of the following specification taken with the accompanying drawing.

BRIEF DESCRIPTION OF THE DRAWING

FIGURE 2 is a substantially large side cross-sectional diagrammatical view of the sensitive portions of the pickoff;

FIGURE 3 is a schematic side sectional view of the invention in accordance with another embodiment of the invention;

FIGURE 4 is a schematic side sectional view of still another embodiment of the invention; and, FIGURE 5 is a schematic side sectional view of still a further embodiment of the invention.

DESCRIPTION OF THE PREFERRED EMBODIMENTS

Figure 1:
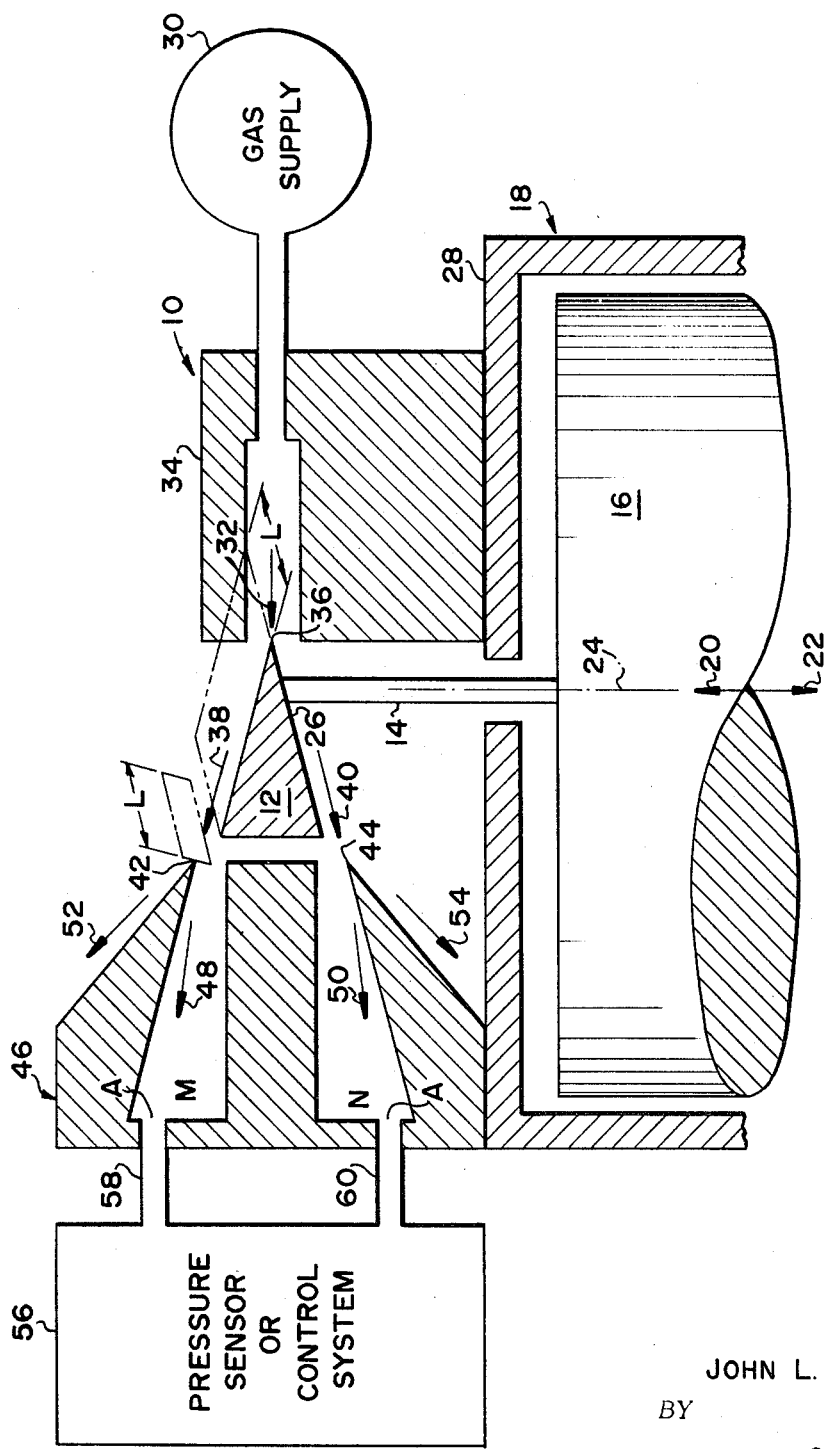
FIGURE 1 is a schematic view showing the overall pneumatic linear displacement pickoff as attached to an instrument to be sensed in accordance with a preferred embodiment of this invention.

Turning to FIGURES 1 and 2 of the drawings, there is shown a pneumatic linear displacement pickoff 10 having an obstructing movably controlled element 12 attached by a mechanical link 14 to a moving body 16 of an instrument 18 to be sensed, such as a proof mass 16 of an accelerometer 18. It should also be noted that since, in small angular displacements, the tangent and angle are equal the pickoff 10 can be also be used to sense small angular motion in other instruments to be sensed having rotary motion.

FIGURE 1 shows the invention mounted on the accelerometer 18. In this instrument 18, acceleration motion, as shown by arrows 20 and 22, along a sensitive axis 24 of the proof mass 16 causes the proof mass 16 to move off null. The magnitude of the displacement is usually made proportional to the acceleration. The obstructing movably controlled element 12, a wedge-shaped knife edge splitter 26, of a substantial length L, out of the plane of FIGURE 1, is rigidly attached to the proof mass 16 by the mechanical link 14 that passes through instrument frame 28. As the proof mass 16 moves along the sensitive axis 24, as shown by arrows 20 and 22, the splitter 26 moves in a like manner. A gas jet stream from a gas supply 30 is directed through a jet pipe 34, as shown by arrow 32, striking a knife edge 36 of the splitter 26. The gas jet stream is then split into two gas jet streams, as shown by arrows 38 and 40, by the knife edge 36 of the splitter 26. Each jet 38 and 40 in turn encounters a leading edge 42 and 44 of a receiver 46 and is again split, some gas flowing into receiver cavities or chambers M and N, as shown by arrows 48 and 50, and some gas flowing outside the receiver chambers M and N, as shown by arrows 52 and 54, respectively. In turn, the differential pressure of gas being directed into the chambers M and N is sensed by a pressure sensor or control system 56, through gas pipes 58 and 60.

The size of the receiver entrances to chambers M and N, as shown in FIGURE 2, is formed by a projection of back corner 62 of the splitter 26 and the leading edge 42 of the receiver 46 and a projection of back corner 64 of the splitter 26 and the leading edge 44 of the reeciver 46. The size of the receiver entrance which is formed by the back corner 62 of the splitter 26 and the leading edge 42 of the receiver 46 controls the quantity of gas flowing into the receiver chamber M, and in turn, the size of the receiver entrance which is formed by the back corner 64 of the splitter 26 and the leading edge 44 of the receiver 46 controls the quantity of gas flowing into the receiver chamber N. That in turn determines the pressure of the receiver chambers M and N. It should be noted that the splitter 26 is made so that the space between the corners 62 and 64 is wider than a central portion formed by corners 66 and 68 of the receiver 46 so that there will be no interference to the gas flow entering the chambers M and N, by the central portion 66 and 68.

Referring to FIGURES 1 and 2, it should be noted that as the proof mass 16 moves in a direction as shown by arrow 20, an amount of δ, in line with the sensitive axis 24 of the proof mass 16, the splitter 26 moves an amount of δ, as shown by arrow 70. One receiver entrance, projected 62 to 42, grows smaller while the other receiver entrance, projected 64 to 44, grows larger, as best viewed in FIGURE 2, in equal amounts. As stated before, the splitter back portion from 62 to 64 is made sufficiently larger than the receiver center portion 66 to 68 so that the proof mass motion cannot expose the corners 66 and 68 and thus interfere with the gas jet streams.

In addition, it should be noted that the areas through which the gas jet streams flow, as shown by arrows 48 and 50, can be easily calculated by letting the length of the splitter 26, as shown schematically in FIGURE 2, equal to the letter L, which is also the receiver entrances out of the plane of the paper and letting the length at null perpendicular to the surface of the splitter 26 of the openings 62 to 42, and 64 to 44, be the small letter $a$. Then the entrance areas at null are each $aL$.

Assuming the proof mass 16 and splitter 26 moves a distance δ, as shown by arrow 70 so that the gap 62 to 42 is diminished and the gap 64 to 44 is increased, then the entrance area to receiver chamber N becomes $$aL + \delta L \cos \theta$$

where $\theta$ is the splitter half angle, and the entrance area to receiver chamber M becomes $aL - \delta L \cos \theta$. It should be noted that the gas jet streams will be directed at an angle of $\theta$ as shown by the arrows 38 and 40 in FIGURES 1 and 2.

When $\theta$ is small, $\cos \theta$ is approximately equal to one and can usually be ignored. Now let the exit areas of the two receiver cavities M and N or the inside cross-sectional area of pipes 56 and 60, be A. Then treating the two receiver chambers M and N as volumes fed and exhausted by sonic orifices, the differential pressure $P_M - P_N$ can be shown to be $P_M - P_N = P_0 \delta L / A$. For subsonic conditions, the situation is more complex. However, the same type of linearity relationship is obtained.

Referring to FIGURE 3 of the drawing there is shown a pneumatic linear displacement pickoff 80 having another type of obstructing movably controlled element, such as a wire 82, having a circular cross-section but of a substantial length along a line perpendicular to the paper and attached by a mechanical link 84 to a proof mass 86 of an accelerometer 88. In the accelerometer 88, acceleration motion, as shown by arrows 90 and 92, along a sensitive axis 94 of the proof mass 86 causes the proof mass 86 to move off null as in the accelerometer 18 of FIGURES 1 and 2. As in the accelerometer 18 the link 84 passes through an accelerometer frame 98. As the proof mass 86 moves along the sensitive axis 94, the wire 82 moves in a like manner. A gas jet stream from a gas supply is directed, as shown by arrow 102, through a jet pipe 104, striking the wire 82 and splitting into two gas jet streams, as shown by arrows 106 and 108. The jet streams are directed into chambers M and N. A receiver 110 and jet pipe 104 being substantially the same as for FIGURES 1 and 2. The movement of the wire 82, in front of the receiver chambers M and N produces a variable differential pressure which is transmitted through the orifices 58 and 60 to a sensor or control system 56 as shown in FIGURE 1. This differential pressure is proportional to the acceleration of the proof mass 86 as in the pickoff 10 of FIGURES 1 and 2.

FIGURE 4 shows the pneumatic linear displacement pickoff 80 having another type of obstructing movably controlled element, such as a bar 112, having a rectangular cross-section but of a substantial length along a line perpendicular to the paper, and attached by the mechanical link 84 to the proof mass 86 of the accelerometer 88, as in the pickoff 80 of FIGURE 3. As in the pickoff 80 of FIGURE 3, the acceleration motion, as shown by arrows 90 and 92, along the sensitive axis 94 of the proof mass 86 causes the proof mass 86 to move off null. The link 84 passes through the accelerometer frame 98. As the proof mass 86 moves along the sensitive axis 94, the bar 112 moves in a like manner. The gas jet stream from the gas supply is directed, as shown by arrow 102, through the jet pipe 104, striking the bar 112 and splitting into two gas jet streams, as shown by arrows 106 and 108, which jet streams are directed into chambers M and N. Variable differential pressure will be produced, by the movement of bar 112, in front of chambers M and N, to be received by the pressure sensor or control system 56, shown in FIGURE 1, through gas pipes 58 and 60 for sensing the acceleration of the proof mass 86.

FIGURE 5 shows the pneumatic linear displacement pickoff 80 having another type of obstructing movably controlled element, such as a mask 114 having an orifice 116, attached by the mechanical link 84 to the proof mass 86 of the accelerometer 88, as in the pickoff 80 of FIGURES 3 and 4. Here again, the acceleration motion, as shown by arrows 90 and 92, along the sensitive axis 94 of the proof mass 86, causes the proof mass 86 to move off null. The link 84 again passes through the accelerometer frame 98. As the proof mass 86 moves along the sensitive axis 94, the mask 114 with the orifice 116, moves in a like manner. The gas jet stream from the gas supply 30, shown in FIGURE 1 is directed, as shown by arrow 102, through the jet pipe 104, striking the mask 114 and passing through the orifice 116, into the two chambers M and N, as shown by arrows 106 and 108. Variable differential pressure will be produced, by the movement of the mask 114, in front of the chambers M and N, to be received by the pressure sensor or control system 56 shown in FIGURE 1, for sensing the acceleration of the proof mass 86, as in the other embodiment of FIGURES 1 and 2, 3, and 4.

Therefore, as brought out before, the advantage of this approach is that no pneumatics are attached to the moving element since no gas flows through the proof mass. The reaction forces due to the gas striking the splitter or other obstructing element are perpendicular to the sensing direction of the pickoff and instrument sensitive element motion and further no active flow components are required on the moving elements. Generally it should be noted that all is needed is some kind of an obstructing element in the path of a gas jet stream that controls a differential pressure output depending on the movement of the obstructing element due to an input parameter. The differential pressure output would be proportional to the input or linear displacement of a moving body of an instrument to be sensed, such as the proof mass of the accelerometer.

What is claimed is:

1. An acceleration responsive device comprising a proof mass movable along a predetermined sensitive axis in response to applied accelerations and a pneumatic pickoff apparatus for producing a differential pressure output proportional to the linear displacement of said proof mass along said axis; said pickoff apparatus including a gas supply for directing a gas jet stream along a direction substantially perpendicular to said predetermined sensitive axis, a receiving means for receiving and sensing the gas jet stream from said gas supply, and an obstructing movably controlled element interposed between said receiving means and said gas supply means and being linearly movable along said sensitive axis in response to motion of said proof mass; said receiving means including a receiver having two chambers, each chamber having an entrance facing substantially in the direction of the gas jet stream, wherein said obstructing element is in front of and substantially half way transversely between the two entrances when said obstructing element is in a null condition for splitting the gas jet stream substantially into two gas jet streams, one gas jet stream being directed into one chamber through its respective entrance and the other gas jet stream being directed into the other chamber through its respective entrance, said accelerometer proof mass being connected to impart motion to said controlled element along the sensitive axis and substantially perpendicularly to the direction of the jet stream thereby producing low interaction therebetween, and being operable for moving said obstructing element linearly and transversely to the entrances of said chambers for changing the amount of gas directed into one or the other of said chambers through their respective entrance dependent on the acceleration of the proof mass for producing a differential pressure, and a pressure sensor connected to the chambers of said receiver for sensing said differential pressure and thereby determining the acceleration of said proof mass.

2. The structure of claim 1, wherein the obstructing element is a wire having a circular cross-sectional shape and extending transverse of the gas jet stream operably dividing the gas jet stream into two gas jet streams and said receiving means for receiving each of the two gas jet streams for producing a differential pressure dependent on the location of the obstructing element in relation to the receiving means.

3. The structure of claim 1, wherein the obstructing element is a bar having a rectangular cross-sectional shape and extending transverse of the gas jet stream operably dividing the gas jet stream into two gas jet streams and said receiving means having means for receiving each of the two gas jet streams for producing a differential pressure dependent on the location of the obstructing element in relation to the receiving means.

4. The structure of claim 1, wherein the obstructing element is a mask having an orifice, the mask having a plane substantially perpendicular to the direction of the gas jet stream and said receiving means having two chambers for receiving variable differential pressure from the orifice of said mask, due to the movement of the mask relative to the receiving means, dependent on the location of the obstructing element in relation to the receiving means.

5. The structure of claim 1, wherein the obstructing element is a wedge-shaped knife edge operably dividing the gas jet stream into two secondary gas jet streams and said receiving means having means for receiving each of the two secondary gas jet streams for producing a differential pressure dependent on the location of the obstructing element in relation to the receiving means.

6. The structure of claim 5, wherein said receiving means has two chambers each chamber having an entrance with a gas jet stream and a splitting edge for dividing the secondary jet streams into two additional jet streams, one of each additional jet streams entering each chamber while the other of each additional jet stream being dissipated outside each of said chambers, whereby a differential pressure is produced within the two chambers dependent on the location of the obstructing element in relation to the receiving means.

References Cited

UNITED STATES PATENTS

| | | | |
|---|---|---|---|
| 2,473,903 | 6/1949 | Purifoy | 73—515 XR |
| 3,171,422 | 3/1965 | Evans | 137—81.5 |
| 3,171,915 | 3/1965 | Johnson | 137—81.5 XR |
| 3,201,999 | 8/1965 | Byrd | 73—515 |
| 3,233,522 | 2/1966 | Stern | 137—81.5 XR |
| 3,258,023 | 6/1966 | Bowles | 137—81.5 |
| 3,275,014 | 9/1966 | Plasko | 137—81.5 |
| 3,276,259 | 10/1966 | Bowles et al. | 137—81.5 XR |
| 3,276,463 | 10/1966 | Bowles | 137—81.5 |
| 3,276,473 | 10/1966 | Lewis et al. | 137—81.5 XR |
| 3,336,932 | 8/1967 | Brooks | 137—81.5 |

SAMUEL SCOTT, Primary Examiner

U.S. Cl. X.R.

137—38, 81.5, 608